April 1, 1952     R. KNUTSON     2,591,556
AUTOMATIC VEHICLE UNLOADER

Filed March 25, 1949     2 SHEETS—SHEET 1

Inventor
Reuben Knutson

By *Clarence A. O'Brien and Harvey B. Jacobson*
Attorneys

April 1, 1952  R. KNUTSON  2,591,556
AUTOMATIC VEHICLE UNLOADER
Filed March 25, 1949  2 SHEETS—SHEET 2

Inventor
Reuben Knutson
By *Clarence A. O'Brien and Harvey B. Jacobson*
Attorneys

UNITED STATES PATENT OFFICE 2,591,556

AUTOMATIC VEHICLE UNLOADER

Reuben Knutson, Zumbrota, Minn.

Application March 25, 1949, Serial No. 83,435

1 Claim. (Cl. 214—83.36)

This invention relates generally to material handling apparatus and more particularly to a wagon having self-unloading means.

A primary object of this invention is to provide a wagon with self-unloading means whereby such material as ensilage and chopped hay and other green heavy crops can be unloaded expeditiously.

Another object of this invention is to provide improved means of the character mentioned above wherein the structure of the elements therein is simplified and the number of moving parts reduced to a minimum, and the general framework of the wagon box is such as to insure rugged as well as economical construction.

And a last object to be mentioned specifically is to provide a device of the character mentioned above which will be safe and simple in operation, easy to repair and durable and efficient.

With these objects definitely in view, this invention resides in certain novel features of construction, combination and arrangement of elements and portions as will be hereinafter described in detail in the specification, particularly pointed out in the appended claim, and illustrated in the accompanying drawings, in which:

Similar characters of reference designate similar or identical elements and portions throughout the specification and throughout the different views in the drawings.

Figure 1:
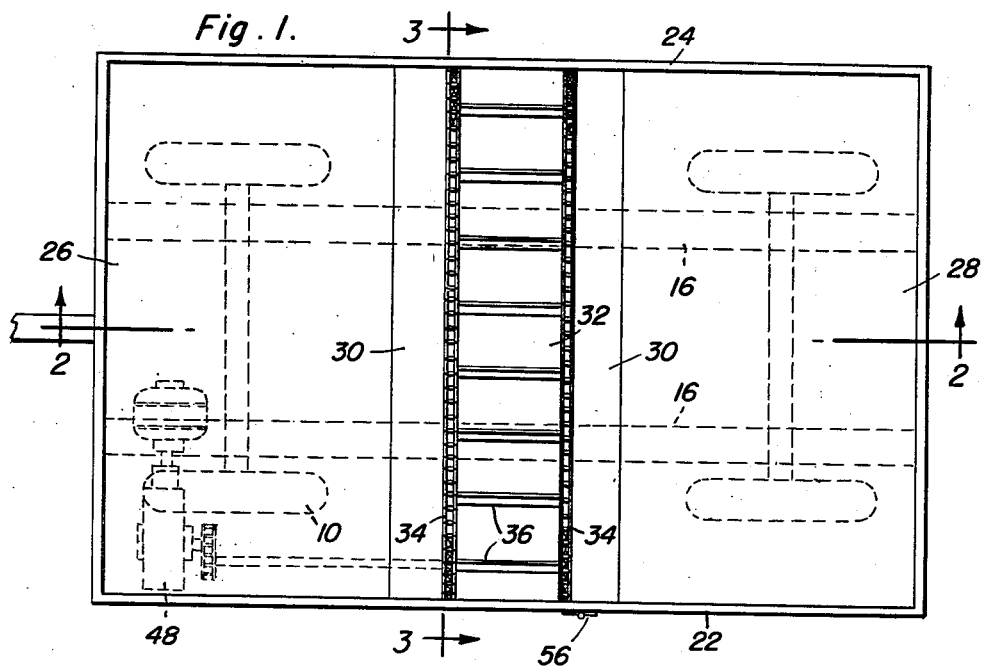
Figure 1 is a top plan view of the assembled device.
Figure 2:
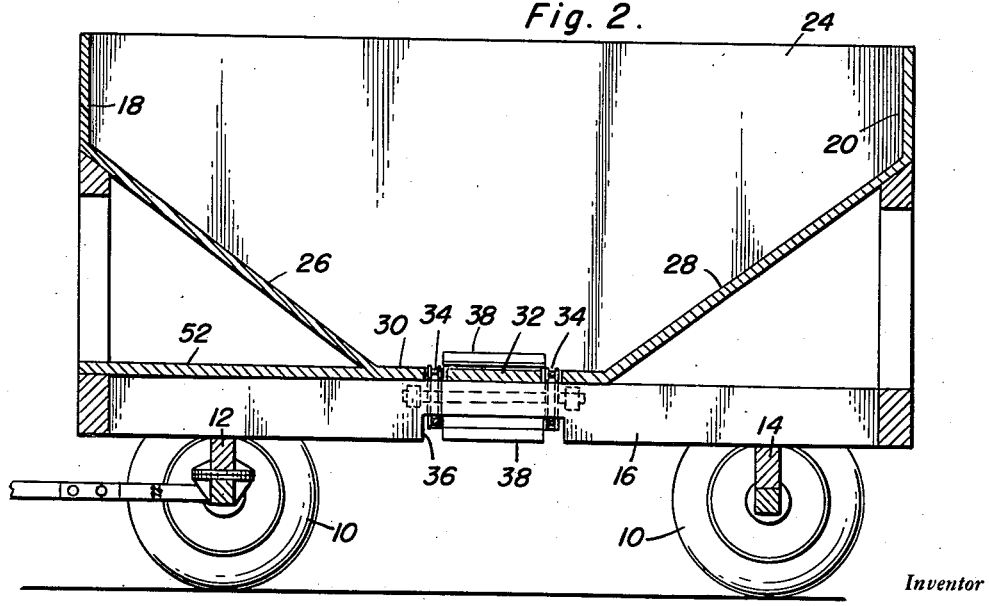
Figure 2 is a vertical sectional view, taken substantially upon the line 2—2 in Figure 1.
Figure 3:
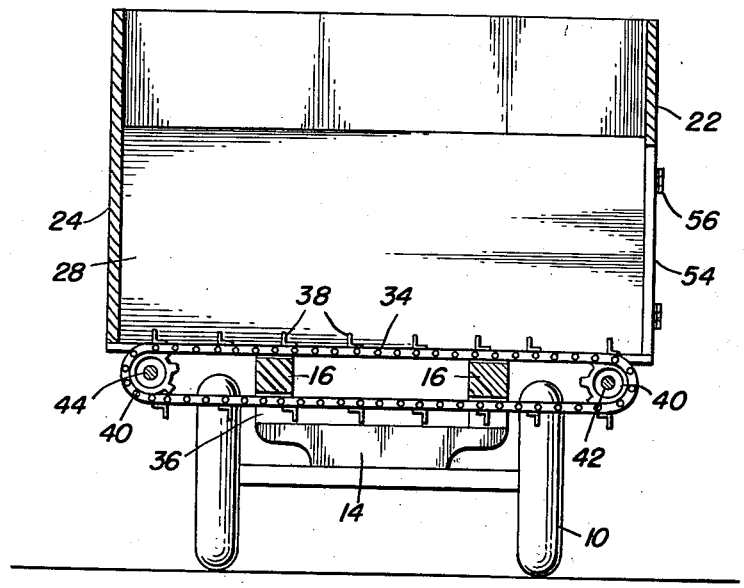
Figure 3 is a transverse vertical sectional view taken substantially upon the line 3—3 in Figure 1.

Referring now to the drawings in detail, this invention includes a wagon having ground-contacting wheels 10 with a necessary complement of parts such as a front bolster 12, a rear bolster 14 and longitudinal stringers 16 supported on these bolsters and extending the full length of the wagon box. This wagon box is comprised of a front vertical end wall 18, a rear vertical end wall 20 and vertical side walls 22 and 24, along with a floor having a front sloping portion 26, a rear sloping portion 28, and a central portion 30, the front and rear portions sloping downwardly for connection with the central portion 30, as will be clearly understood from an inspection of Figure 2. It should be carefully noted that the central portion 30 of the floor includes an elongated panel 32 supported directly on the stringers 16 and extending longitudinally of a conveyor, the endless chains 34 of which are disposed on either side of this panel 32.

The endless chains 34 are received, in part, in channels formed on either side of the panel 32 and between the two parts of the central portion 30 of the floor. The stringers 16 are also recessed, as indicated at 36, to receive lower portions of the endless chains 34.

Figure 4:
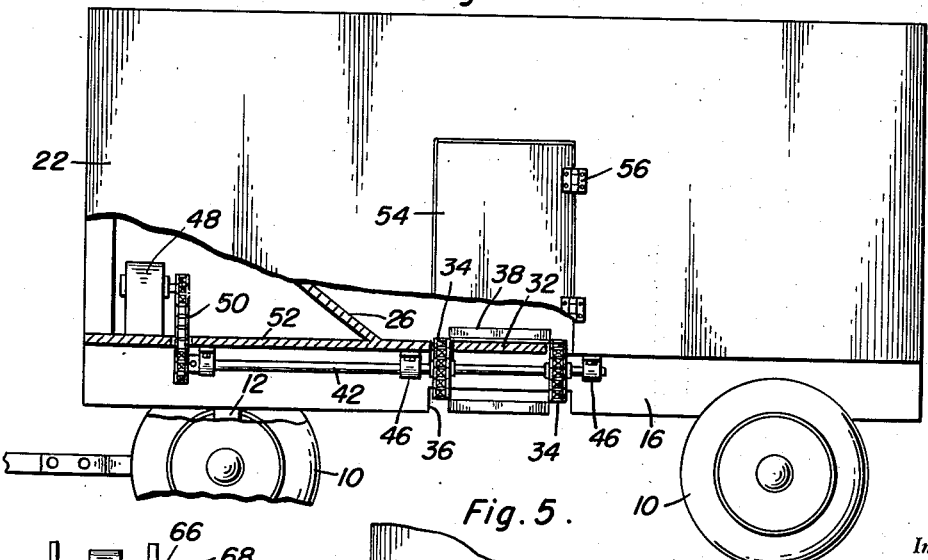
Figure 4 is a side elevational view with a portion broken away and the underlying portions shown in vertical section and in elevation.

The conveyor also includes a plurality of spaced angle iron cleats or scoops 38 and these scoops are each terminally secured to corresponding oppositely disposed links of the chains, being preferably welded to those edges of said links adjacent to the other chain and remote from the center of the conveyor. Since the thickness of the chains 34 and the panel 32 is nearly uniform, the scoops 38 fractionally contact the upper surface of this panel 32, it being understood that the chains 34 are supported on sprockets 40 which are rigidly mounted on shafts, Figure 4 representing a preferred arrangement in which a drive shaft 42 and a driven shaft 44 are supported in bearings 46 on the under side of the wagon box and so that the endless chains 34 may be driven and guided according to conventional practice.

A prime mover 48 may be connected by means of a drive chain 50 and suitable sprockets with the drive shaft 42, and it should be noted that this prime mover, possibly a gasoline engine, will be mounted on an underfloor 52 disposed horizontally beneath the front sloping portion 26 of the wagon box, the underfloor 52 being supported upon the stringers 16. The vertical side wall 22 of the wagon box is provided with a vent and a door 54, hinged as at 56, to allow the material carried by the conveyor to be unloaded at the side of the wagon box.

Figure 5:
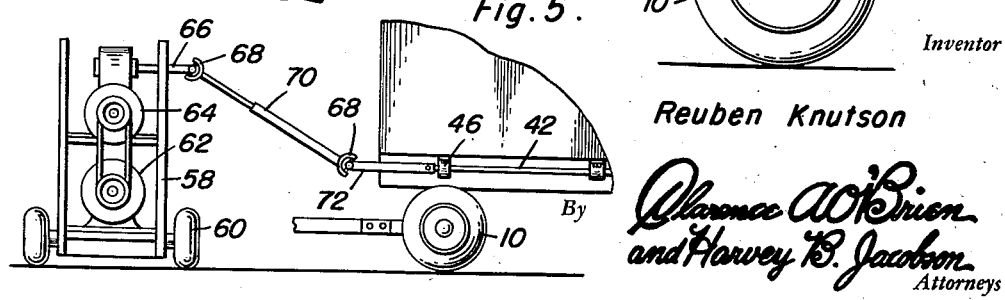
Figure 5 is a somewhat diagrammatic view showing a portable power unit which is disengageably secured to the drive shaft of the device when it is desired to unload material from the wagon box, and when a prime mover is not installed on the wagon.

When it is desired to delete the prime mover 48, a portable power unit such as that represented in Figure 5 will be provided. This power unit includes a frame 58 having ground-contacting wheels 60 and a prime mover 62. The prime mover 62 will be connected through suitable reduction gearing, indicated at 64, with a shaft 66. This shaft 66 is provided with universal joints 68 and an extensible section 70, so that a suitable terminal socket member 72 may be releasably secured to one end of the drive shaft 42 of the conveyor.

The operation of this invention will be clearly understood from a consideration of the drawings and the above described mechanical details thereof, and further description would appear to be unnecessary.

Minor variation from the embodiment described herein may be resorted to without departure from the spirit and scope of this invention, and the drawings and specification are to be considered as illustrative rather than limiting.

Having described the invention, what is claimed as new is:

A wagon having self-loading means comprising a wagon box having front and rear vertical end walls and vertical side walls, a floor having portions sloping downwardly from the front and rear end walls and a central portion between the lower ends of said sloping portions, an endless conveyor mounted on said central portion transversely of the wagon box, a vent in one of said side walls at one end of said conveyor, an under floor beneath one of said sloping portions, and means to operate said conveyor, said conveyor comprising a pair of endless chains, a pair of shafts having sprockets to drive and to guide said chains, and cleats terminally secured to and between corresponding links of said chains, said cleats being secured to the edges of said links adjacent to the other chain and remote from said shafts, said wagon box having longitudinal stringers, said central portion of the floor including a panel supported by said stringers and extending longitudinally of said conveyor and on a level with and between the uprights of said endless chains, said stringers being recessed to receive said chains, said shafts being mounted in bearings on the undersides of said underfloor and said central portion of the floor, and said means to operate the conveyor comprising a prime mover connected with one of said shafts and mounted on the upper side of said underfloor, said prime mover having a drive sprocket, one of said shafts having a sprocket beneath said drive sprocket, and a sprocket chain extending through an aperture in said under floor and operatively connecting said sprockets.

REUBEN KNUTSON.

REFERENCES CITED

The following references are of record in the file of this patent:

UNITED STATES PATENTS

| Number | Name | Date |
|---|---|---|
| 507,122 | Harrington | Oct. 24, 1893 |
| 1,375,535 | Ortgier | Apr. 19, 1921 |
| 2,275,799 | Oklejas | Mar. 10, 1942 |
| 2,290,460 | Winsor | July 21, 1942 |
| 2,345,328 | Conway et al. | Mar. 28, 1944 |
| 2,355,226 | Mallory | Aug. 8, 1944 |
| 2,475,590 | Carbert | July 12, 1949 |